Figure 1:
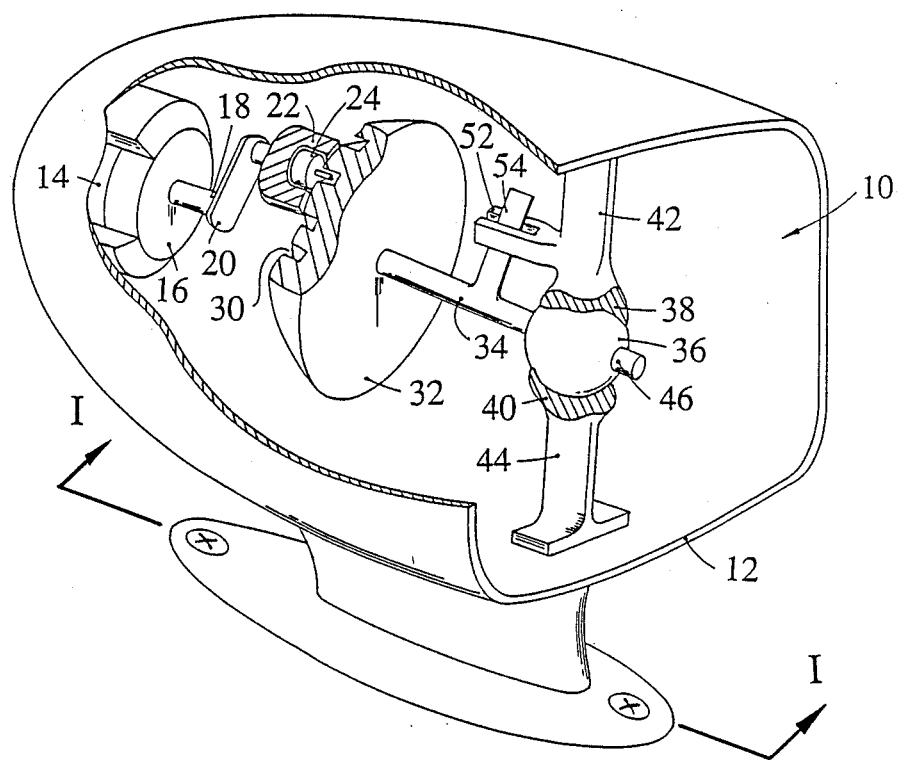

United States Patent [19]

Cleghorn et al.

[11] Patent Number: 4,925,289
[45] Date of Patent: May 15, 1990

[54] REAR VIEW MIRROR ADJUSTABLE BY A SINGLE MOTOR

[76] Inventors: William L. Cleghorn; Charles H. Cleghorn, both of 15 Rodney Blvd., Willowdale, Ontario M2N 4B5, Canada

[21] Appl. No.: 416,482

[22] Filed: Oct. 3, 1989

[51] Int. Cl.$^5$ .............................................. G02B 5/08
[52] U.S. Cl. .................................... 350/637; 350/632; 248/477
[58] Field of Search ................ 350/606, 626, 632, 634, 350/636, 637; 248/477

[56] References Cited

U.S. PATENT DOCUMENTS

| | | |
|---|---|---|
| 3,565,515 | 2/1971 | Mey . |
| 3,628,862 | 12/1971 | Stephenson ........................ 350/636 |
| 3,711,179 | 1/1973 | Takeda . |
| 4,474,428 | 10/1984 | Wunsch . |
| 4,540,252 | 9/1985 | Hayashi et al. ..................... 350/634 |

FOREIGN PATENT DOCUMENTS

| | | |
|---|---|---|
| 3103908 | 5/1981 | Fed. Rep. of Germany . |
| 0022243 | 2/1977 | Japan ................................... 350/636 |
| 0026037 | 3/1978 | Japan ................................... 350/637 |
| 0167346 | 9/1984 | Japan . |
| 1034027 | 3/1982 | U.S.S.R. . |

Primary Examiner—Bruce Y. Arnold
Assistant Examiner—R. D. Shafer
Attorney, Agent, or Firm—Smart & Biggar

[57] ABSTRACT

A remote-controlled rear-view mirror assembly is movably supported in a housing and can be adjusted by an electric motor from a remote point. An electric motor is mounted in the mirror housing and has an electrically reversibly direction of rotation and stepdown gearing. The drive shaft is connected to a crank. A pin connected to the crank executes circular motion about the centerline axis of the drive shaft when the motor is activated. The pin slides in an endless groove cut in the face of a spherically shaped cam. The spherically shaped cam and mirror are rigidly attached at opposite ends of a common shaft. The common shaft has a spherical ball located at a point between the two ends. The spherical ball moves within a spherical cup which is attached to the mirror housing. The movement of the pin in the groove causes the mirror to pivot about the center of the spherical ball joint, giving the mirror its necessary range of motion. Extraneous rotational motion of the mirror about the centerline axis of the common shaft is prevented by use of an anti-rotation tag and tag rest.

6 Claims, 4 Drawing Sheets

REAR VIEW MIRROR ADJUSTABLE BY A SINGLE MOTOR

The present invention relates to a rear view mirror which is adjustable by means of a single electric motor.

Rear view mirrors on automobiles which can be adjusted from the driver's seat by means of electric motors are known. With these remote-controlled mirrors, two motors are usually employed and operated independently of each other, one motor controlling motion of the mirror about the vertical axis, the other controlling motion about a horizontal axis. A substantial proportion of the cost of such a system is the electric motors. Therefore, it is desirable to find a means by which only one motor could be used to produce the necessary motion.

Use of one motor with a transmission which can be electro-magnetically switched between two pivot axes of the mirror, is known. However, this type of mirror adjustment is structurally complicated and expensive to manufacture.

U.S. Pat. No. 4,474,428 to Wunsch issued Oct. 2, 1984 also discloses an arrangement to pivot a mirror with a single electric motor. A drive shaft is clutched to two eccentrics. Two wrap springs are provided, one to wrap the base of each eccentric and a member attached to the drive shaft. The arrangement is such that rotation of the drive shaft in one direction imparts rotation to one of the eccentrics while leaving the other stationary. Rotation of the drive shaft in the opposite direction rotates the other eccentric and leaves the first stationary. One eccentric controls vertical pivoting and the other horizontal pivoting. The structural complexity of this mechanism makes for costly manufacture.

Most known rear-view mirror adjustment mechanisms require the operator to choose between four movement selections—up or down motion or motion to either side—in searching for a proper mirror setting. This may make proper selection difficult. The present invention seeks to provide a mirror adjustment mechanism that requires only a single electric motor, is of simple, inexpensive construction, and requires only one or two movement selections.

According to the invention there is provided an adjustable rear-view mirror comprising: a shaft means medially supported for universal rotation; a cam supported by one end of said shaft means having an outwardly directed convex surface inscribed with a curvilinear endless groove; a mirror supported by the other end of said shaft means; a tongue drivable in a circular path, said tongue received by said endless groove; and drive means to drive said tongue in said circular path.

Figure 2:
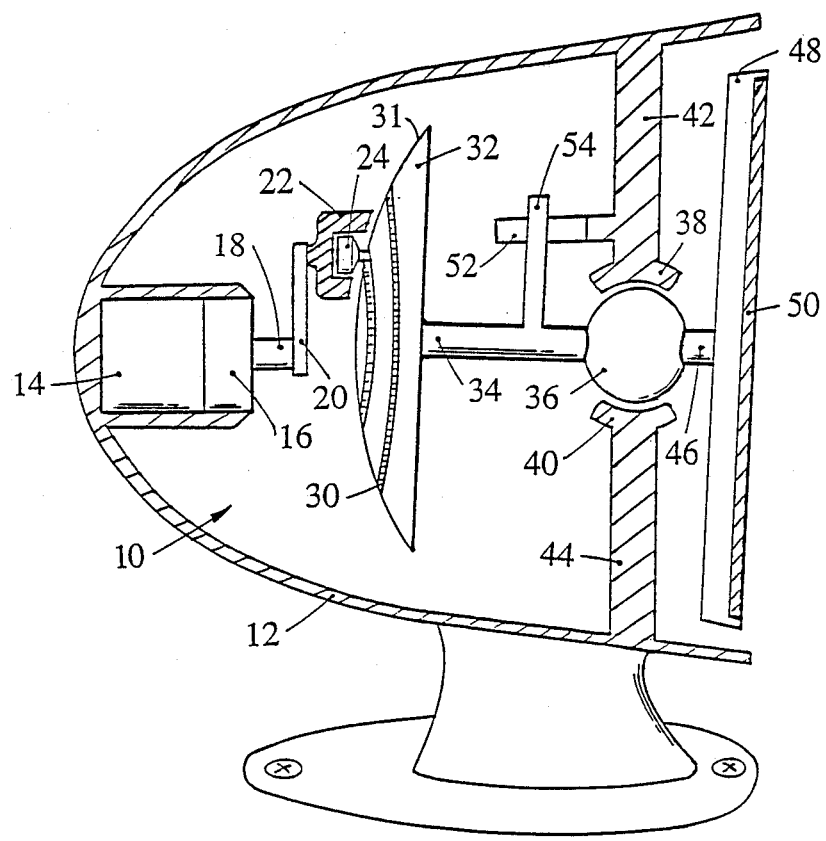
Figure 3:
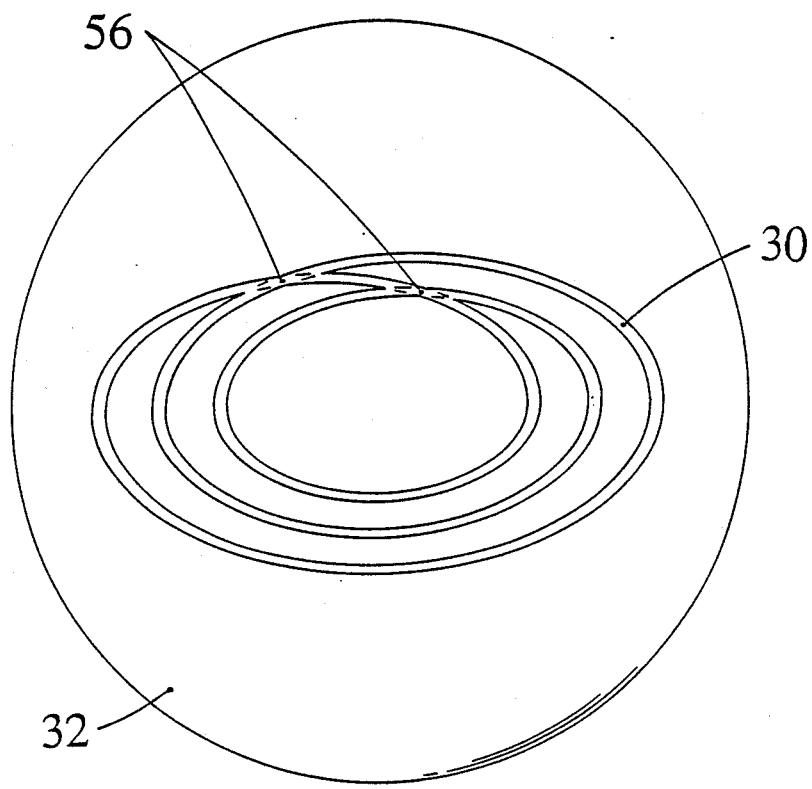
Figure 4:
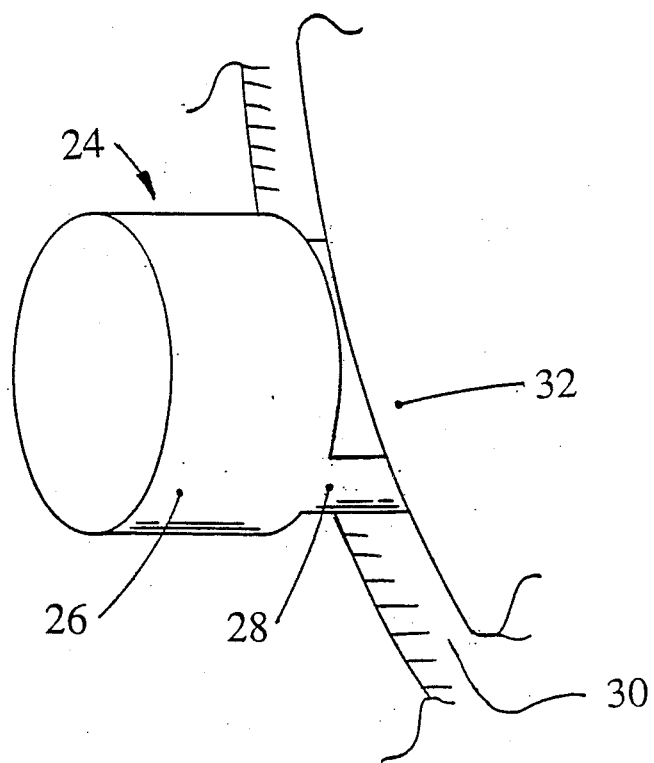

In the figures which disclose an example embodiment of the invention:

FIG. 1 is a partially cut away perspective view of a rear-view mirror housing assembly incorporating the adjustment mechanism of the subject invention, FIG. 2 is a section along the line I—I of FIG. 1 but also includes a mirror, FIG. 3 is a plan view of a portion of FIG. 1, and FIG. 4 is an enlarged perspective view of another portion of FIG. 1.

Turning to FIGS. 1 and 2, the adjustment mechanism of the subject invention is illustrated generally at 10. The adjustment mechanism is accommodated in a rear-view mirror housing 12. The mechanism comprises a reversible electric motor 14 connected to step down gearing 16. The output shaft 18 of the gearing is connected to crank 20. Crank 20 terminates in drive housing 22 which has a cylindrical opening receiving drive pin 24. As best seen in FIG. 4, drive pin 24 has a cylindrical base 26 and a tongue 28.

The tongue 28 of the drive pin engages a curvilinear endless groove 30 in convex face 31 of cam 32. Cam 32 comprises a spherical segment. A shaft 34 rigidly joins the center of the back of the cam to spherical bearing 36. The spherical bearing is supported for universal rotation by pads 38 and 40 of stalks 42 and 44. The stalks are in turn supported by housing 12. A shaft 46, having an axis coincident with shaft 34, extends from spherical bearing 36 and, as seen in FIG. 2, terminates in mirror backing plate 48 which supports mirror 50.

A fork 52 having resilient tangs extends from stalk 42. The tangs of fork 52 receive tag 54 projecting radially from shaft 34.

By reference to FIG. 3 it will be seen that groove 30 of cam 32 forms an endless loop of generally concentric oval shapes. It will be noted that the groove intersects with itself at intersections 56.

When the electric motor 14 is activated, the drive housing 22 and hence the tongue 28 of the drive pin 24, executes a circular motion about the centerline axis of shaft 18. This causes drive pin 24 to move in the endless groove 30 of the convex surface 31 of cam 32. As drive pin 24 moves in groove 30 it may rotate within drive housing 22 due the fit of its cylindrical base 26 within the cylindrical opening of the drive housing 22. Such rotation allows the cant of the tongue 28 to change as it circulates around the generally oval shapes which form the endless groove 30, thus preventing jamming. The tongue 28 of the drive pin 24 extends across the diameter of the cylindrical base 26 of the drive pin 24 so that the drive pin always takes the more straight line path of the groove through the intersections 56.

As the drive pin 24 circulates in the endless groove, it causes the cam 32 to move in oval paths determined by the endless groove 30. This motion is transmitted through the spherical bearing 36 to mirror 50.

Rotation of crank 20 driving drive pin 24 may torque shaft 34 so as to rotate it about its longitudinal axis. Such rotation is restrained by tag 54 in fork 52. This arrangement allows shaft 34 to rock up and down and, by virtue of the resilience of the tangs of the fork 52, permits limited rotation to allow shaft 34 to trace the generally oval paths dictated by cam 32.

In the result, when the electric motor is activated, the mirror 50 moves through gradually changing horizontal and vertical angles as the drive pin follows the groove through one complete cycle, and then the pattern of motion is repeated. The oval shapes of the groove 30 cause the mirror 50 to move through a greater angle about the vertical axis of the mirror than about the horizontal axis.

The electric motor is reversible so that should an operator overshoot a desired mirror position he may readily return to same without the need for circulating through the entire pattern of mirror motion again. Preferably, electronics are provided so that the reverse speed of the motor is slower than the forward speed. This enables an operator to more easily make a sensitive final adjustment.

With the electric motor inactive, friction between pads 38 and 40 assist in maintaining the mirror in a stationary position.

The embodiments in which an exclusive property or privilege is claimed are defined as follows:

1. An adjustable rear-view mirror comprising:
   (a) a shaft means medially supported for universal rotation;
   (b) a cam supported by one end of said shaft means having an outwardly directed convex surface inscribed with a curvilinear endless groove;
   (c) a mirror supported by the other end of said shaft means;
   (d) a tongue drivable in a circular path, said tongue received by said endless groove; and
   (e) drive means to drive said tongue in said circular path.

2. The adjustable rear-view mirror of claim 1 wherein said curvilinear endless groove comprises a series of generally concentric oval shapes.

3. The adjustable rear-view mirror of claim 2 comprising a tag extending radially from said shaft means and resilient means to restrain said tag in order to limit the rotation of said shaft means.

4. The adjustable rear-view mirror assembly of claim 3 wherein said drive means to drive said tongue in said circular path comprises:
   (a) an electric motor operatively connected to a crank arm; and
   (b) a base supporting said tongue; said crank arm rotatably receiving said base.

5. The adjustable rear-view mirror assembly of claim 4 wherein said means for supporting said shaft means for universal rotation comprise:
   (a) a spherical bearing medially located on said shaft means; and
   (b) stalk means universally supporting said spherical bearing.

6. The adjustable rear-view mirror assembly of claim 5 wherein said resilient means to restrain said tag comprise a resilient fork extending from said stalk means.

* * * * *